UNITED STATES PATENT OFFICE.

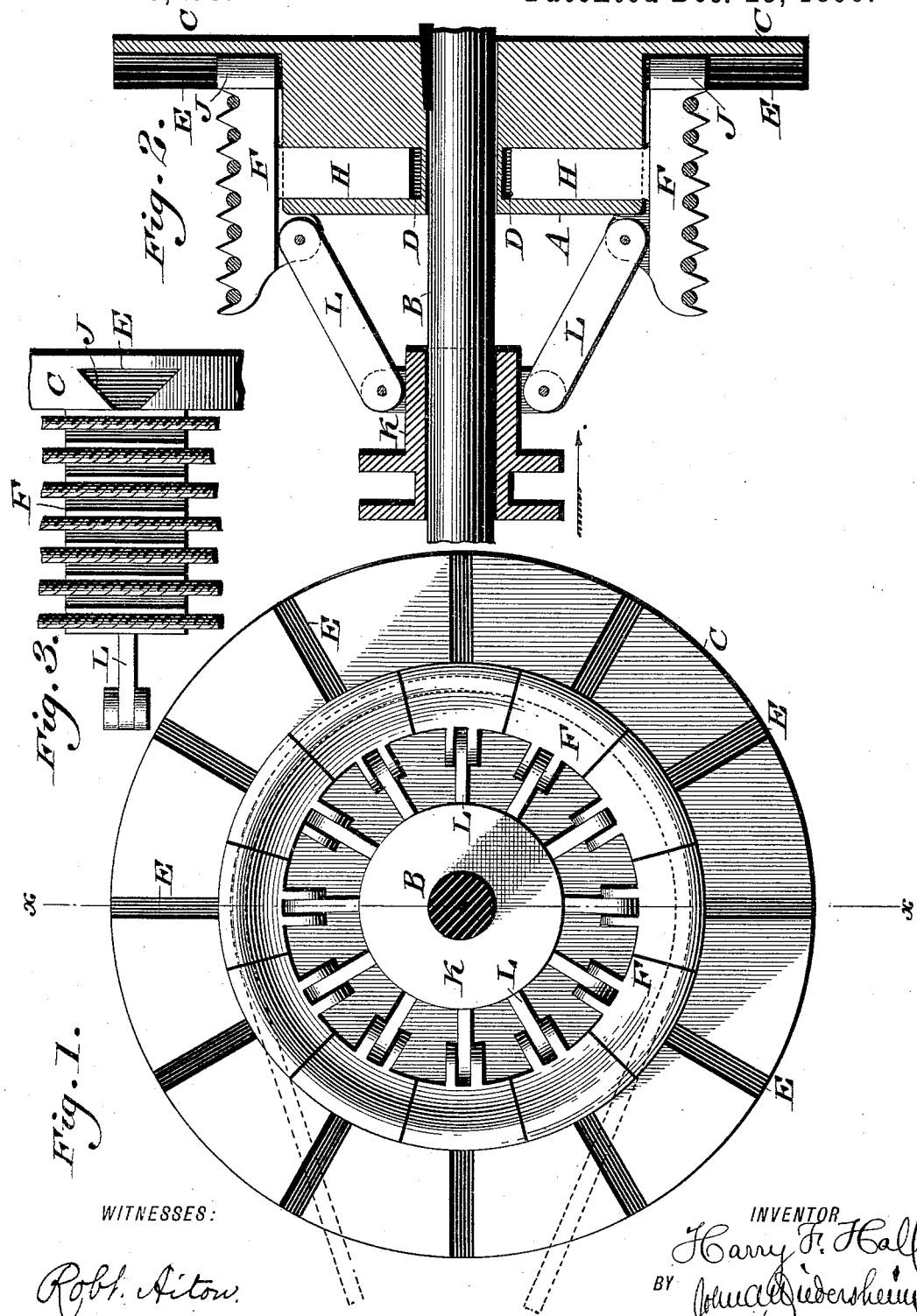

HARRY F. HALL, OF NEW YORK, N. Y.

EXPANSIBLE WHEEL.

SPECIFICATION forming part of Letters Patent No. 443,276, dated December 23, 1890.

Application filed August 26, 1890. Serial No. 363,096. (No model.)

*To all whom it may concern:*

Be it known that I, HARRY F. HALL, a citizen of the United States, residing in the city, county, and State of New York, have invented a new and useful Improvement in Expansible Wheels or Pulleys, which improvement is fully set forth in the following specification and accompanying drawings.

My invention relates to improvements in expansible wheels or pulleys, as will be more fully hereinafter referred to.

Figure 1 represents an end view of a wheel embodying my invention. Fig. 2 represents a section on line $xx$, Fig. 1. Fig. 3 represents a plan view of a detached portion thereof.

Similar letters of reference indicate corresponding parts in the several figures.

Referring to the drawings, A designates a wheel or pulley mounted on the rotary shaft B, having on one side and preferably integral therewith a disk C, extending beyond the periphery of the main portion or hub of the wheel. In the said main portion are radial recesses D, the walls of which are at right angles to the shaft B, and in the inner side of the projecting portion of the disk are dovetail recesses or grooves E.

The movable heads F may be either grooved, as shown in the drawings, or may be plain and have thereon any suitable belting—as bands, chains, or ropes—for communicating power thereto, and are provided with the cylindrical stems H, closely fitting in the recesses D of the wheel, so as to slide freely therein without lateral motion. Connected with each of the heads is a dovetail portion or end J, adapted to fit in a recess or groove E, and thus aid in insuring the movement of the head in the proper direction.

To operate the heads F, and thereby change the diameter of the wheel, a sleeve K, movable endwise on the shaft, is employed, the said sleeve being connected by the links L to the heads F. It will be seen that by having the direction of the movements of the heads F at a right angle to the shaft of the wheel less lateral strain is had than if the direction of the movement was oblique to the shaft.

The dovetail connection of the head with the disk and the insertion of the stem within the main portion of the wheel furnishes a strong and reliable connection of the head and wheel, thereby preventing any separation or displacement of these parts when either adjusting or operating the wheel.

Having thus described my invention, what I claim as new, and desire to secure by Letters Patent, is—

1. The combination of a shaft, a wheel or pulley having a main portion with radial recesses therein, a disk of larger diameter than the said main portion firmly connected therewith at right angles to said shaft, and having grooves on its face adjacent to said main portion, heads with stems fitting in said radial recesses, and end portions fitting in said grooves, and mechanism, substantially as described, pivotally connected with said head, for moving the same at right angles and in radial lines from said shaft, substantially as described.

2. The combination of a shaft, a wheel or pulley with radial recesses therein, a disk connected with said wheel and having grooves on its face adjacent to the pulley, heads with stems fitting in the said radial recesses, and end pieces fitting in the grooves of the disk, a sleeve on said shaft, and links pivoted to said sleeve and head, said sleeve being adapted to slide on said shaft, substantially as described.

HARRY F. HALL.

Witnesses:
   GEO. W. WHITE,
   JOHN B. DOEAUX.